United States Patent [19]

Sivyer

[11] Patent Number: 5,632,556
[45] Date of Patent: May 27, 1997

[54] THERMOWELL APPARATUS FOR SENSING TEMPERATURE IN PETROCHEMICAL APPLICATIONS

[75] Inventor: Robert B. Sivyer, Houston, Tex.

[73] Assignee: Sivco, Inc., Houston, Tex.

[21] Appl. No.: 357,327

[22] Filed: Dec. 16, 1994

Related U.S. Application Data

[63] Continuation-in-part of Ser. No. 158,434, Nov. 29, 1993, abandoned.

[51] Int. Cl.⁶ ............... G01K 1/08; G01K 1/14; G01K 13/02; G01K 7/04
[52] U.S. Cl. ............ 374/138; 374/148; 136/230; 136/242
[58] Field of Search ............ 374/138, 148; 136/230, 242

[56] References Cited

U.S. PATENT DOCUMENTS

| | | | |
|---|---|---|---|
| 2,414,370 | 1/1947 | Floyd | 374/148 |
| 2,588,840 | 3/1952 | Howland | 374/138 |
| 2,970,475 | 2/1961 | Werner | 374/138 |
| 3,000,213 | 9/1961 | Eves et al. | 374/138 |
| 3,911,747 | 10/1975 | Sivyer | 136/230 |
| 4,152,938 | 5/1979 | Danninger | 374/138 |
| 4,244,222 | 1/1981 | Hoyer et al. | 374/138 |
| 4,324,945 | 4/1982 | Sivyer | 374/148 |
| 4,403,872 | 9/1983 | DeLeo | 374/138 |
| 5,356,219 | 10/1994 | Tammera et al. | 374/138 |

FOREIGN PATENT DOCUMENTS

| | | | |
|---|---|---|---|
| 2680872 | 3/1993 | France | 374/138 |
| 0676375 | 6/1939 | Germany | 374/148 |
| 0190759 | 7/1937 | Switzerland | 374/138 |
| 1046627 | 10/1983 | U.S.S.R. | 374/138 |

*Primary Examiner*—Diego F. F. Gutierrez
*Attorney, Agent, or Firm*—Donald H. Fidler

[57] ABSTRACT

A thermowell apparatus for a Petrochemical Application where a temperature sensing probe is used for a high temperature cracking furnace. The sensing probe is mounted on a flow line of the furnace fired processing unit. The tip member of the probe extends into the cross-section of the pipe. The probe member has a tear shaped design in transverse cross-section which is arranged with a leading edge surface to deflect the fluid flow and thereby increase the life expectancy of the tip member.

4 Claims, 2 Drawing Sheets

THERMOWELL APPARATUS FOR SENSING TEMPERATURE IN PETROCHEMICAL APPLICATIONS

PRIOR APPLICATION

This application is a continuation-in-part of application Ser. No. 08/158,434 filed Nov. 29, 1993, now abandoned.

BACKGROUND OF THE INVENTION

In the processing of gas, oil or kerosene to ethylene, the liquid is fed in to piping which passes through a heated furnace and exits as a gas. The piping in the furnace is tortuously arranged in a vertical plane and supported from the roof of the furnace. One or more temperature sensing devices are used to sense the temperature of the fluids in the pipes for regulation of the temperature and rate of flow. The piping in the furnace can be independently supported with respect to the temperature sensing device. One such device is illustrated in U.S. Pat. No. 3,911,747.

One of the problems involved with temperature sensing devises in a cracking furnace is their longevity with respect to the piping. As a practical matter, if the temperature sensing device has a life expectancy matched with the life expectancy of the pipe, then repairs and costs are reduced or minimized. In U.S. Pat. No. 4,324,945, a one piece temperature sensing assembly is welded to the piping in a furnace. The temperature sensing assembly is constructed of materials and a wall configuration to minimize stress changes due to temperature effects and to support piping in a furnace and to have a comparable longevity to the life span of the piping. This is accomplished by optimizing wall cross-sections for optimum strength and selected welded locations and materials.

THE PRESENT INVENTION

The present invention is embodied in a temperature sensing probe for a high temperature cracking furnace. The sensing probe is mounted on a flow line of the furnace fired processing unit. The tip member of the probe extends into the cross-section of the pipe. The probe member has a tear shaped design in transverse cross-section which is arranged with a leading edge surface to deflect the fluid flow and thereby increase the life expectancy of the tip member.

DESCRIPTION OF THE PRESENT INVENTION

Figure 1:
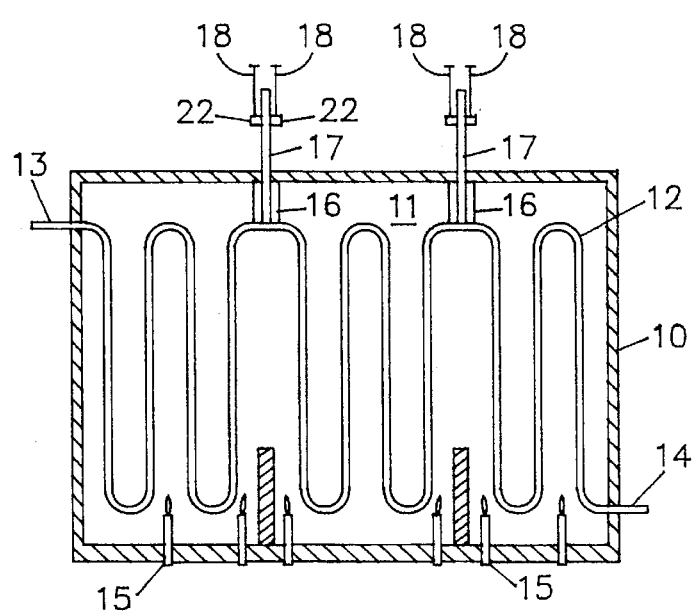
FIG. 1 is a schematic illustration of a furnace in which the present invention is utilized.

The furnace 10 in FIG. 1 is illustrated in vertical cross-section and includes side, top and bottom walls. The interior 11 of the furnace 10 has one or more continuous flow pipes 12 which are disposed in a vertical plane and have a tortuous path through the furnace. The inlet 13 of a pipe 12 receives the input liquid such as kerosene and the outlet 14 of the pipe discharges a gas. Burners 15 supply the heat for the process. In the top wall of the furnace are downwardly extending openings 16. Passing through the openings 16 are the temperature sensors 17 of the present invention. The sensors 17 are supported by hangers 18 on the exterior of the furnace and are attached to the pipe 12.

Figure 2:
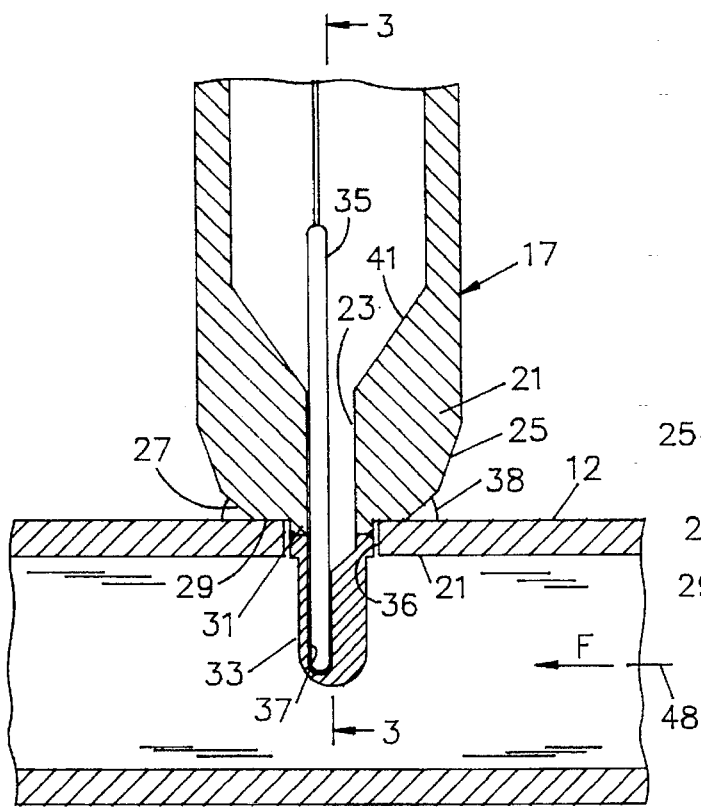
FIG. 2 is an enlarged view in vertical cross-section through a portion of the temperature sensor.
Figure 3:
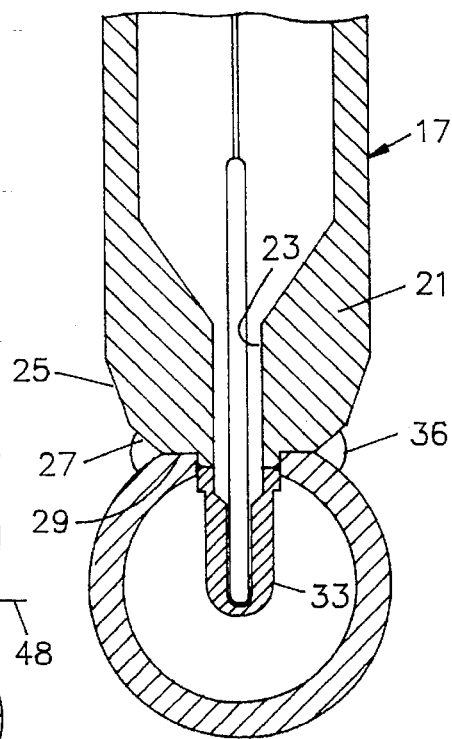
FIG. 3 is an view in vertical cross-section taken along line 3—3 of FIG. 2.

Referring now to FIG. 2, the lower end of a sensor 17, similar to that sensor as illustrated in U.S. Pat. No. 4,324,945, is shown in cross-section. The sensor 17 at its lower end has a thickened wall section 21 with a small center bore 23. The outer, lower part of the wall section 21 has on upper, outer relief tapered section 25 and a lower welded tapered section 27 which joins a transverse shoulder surface 29. A tubular sensor tip member 33 projects downwardly from the shoulder surface 29 and is attached by welding to a tubular stub end 31 on the sensor 17. The tip member 33 is constructed from high temperature, corrosion and erosion resistant material. The sensor 17 is constructed from an alloy 800 H material and is sufficiently massive in size within the furnace to resist stress rupture failure or creep rupture failure due to temperatures up to 2000° F. which are involved in the process. The pipe 12 is typically a HK40 material which is 25% chrome; 25% nickel and 50% iron.

The furnace pipe 12 is provided with an cylindrically shaped opening 36 about an axis perpendicular to the central axis 48 of the pipe 12. The opening 36 is sized to receive the sensor tip member 33. The sensor tip member 33, when attached to the pipe 12 by welding, is sized in length to terminate short of the center line 48 of the pipe 12. The minimum wall thickness of the tip member 33 is made adequate to resist the flow and temperature of the fluids in relation to the wall thickness of the pipe 12. Generally, it is desirable to have the minimum wall thickness of the tip member 33 as thin as possible to minimize the flow obstruction in the pipe.

As illustrated, an elongated cylindrically shaped thermocouple 35 extends through the bore 23 in the sensor wall section 21 and is seated in a bore 37 in the tip member 33. The bore 37 is sized to a relatively close fit with the thermocouple 35. An inner tapered surface 41 in wall section 21 is used to guide the thermocouple 35 into the bore 23 and to the tip member 33.

The outer weld bevel 27 on the wall section 21 permits a weld 38 of 625 material to attach the pipe 12 to the sensor body 17.

In the present invention, the tip member 33 is constructed from a hardened material which is corrosion and erosion resistant at high temperatures. A material such as stellite #6 steel is suitable and the tip member 33 is preferably investment cast, as is well known in the art.

Figure 4:
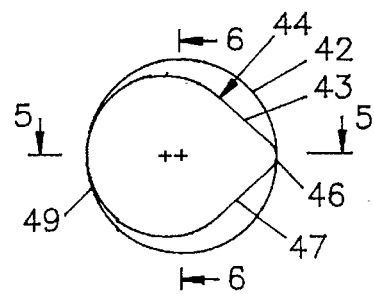
FIG. 4 is an end view of the temperature sensor taken along line 4—4 of FIG. 2.
Figure 5:
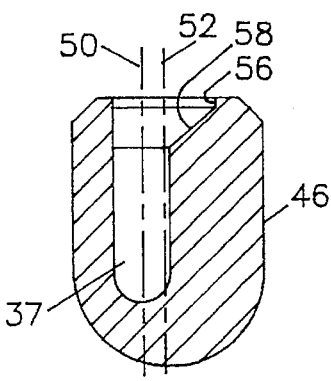
FIG. 5 is a view in cross-section taken along line 5—5 of FIG. 4.
Figure 6:
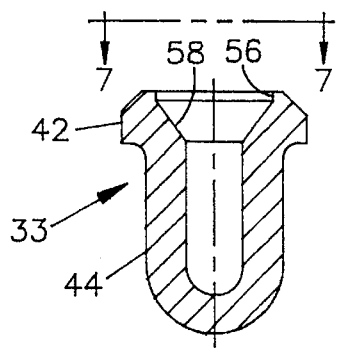
FIG. 6 is a view in cross-section taken along line 6—6 of FIG. 4.
Figure 10:
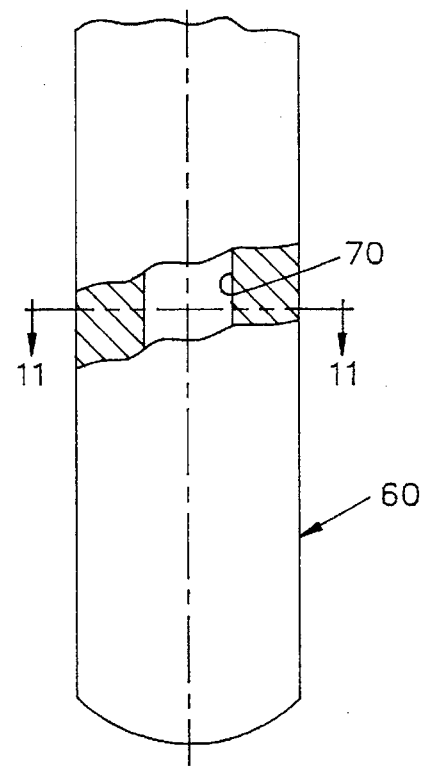
FIG. 10 is a view in longitudinal and partial cross-section of a tip member according to the present invention.

As illustrated in the drawings, FIGS. 4 and 6, the tip member 33 has an upper annular wall section 42 and a depending housing section 44. The annular wall section 42 is sized to closely fit in the cylindrical opening 36 for welding purposes. The depending housing 44 is tear shaped in transverse cross-section. The vertical apex or leading edge 46 of the housing 44 (see FIGS. 4 and 5) is disposed along an axis transverse to the central axis 48 of the pipe 12 and faces into the direction of fluid flow F (see FIG. 2).

Figure 7:
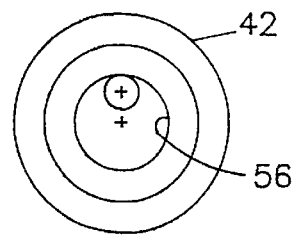
FIG. 7 is an end view taken along line 7—7 of FIG. 6.

The leading edge 46 is preferably rounded and connected by tapered surfaces 43, 47 to a semi-cylindrical surface 49. The blind bore 37 for the thermocouple 35 is located along an transverse axis 50 which is located transverse to the central axis 48 and which is offset with respect to a transverse axis 52 for the bore 23. The axis 50, 52 are parallel to one another and intersect the central axis 48 of the pipe 12. At the upper end of the tip member 33 is a bore 56 (see FIGS. 6 and 7) which aligns with the bore 23 of the housing 17 and the bore 56 is connected to the thermocouple bore 37 by a tapered, transition section 58. The tapered transition section 58 provides guidance for locating the thermocouple 35 in the bore 37.

With the present invention, the tear shaped configuration of the tip member 33 is aligned relative to the direction of flow to provide an aero-dynamic deflection surface for the fluids rather than an obstruction as a cylindrical surface does. Thus, the configuration minimizes deleterious impingement of the fluids with the tip member and thereby extends the life of the tip member. The included angle between the surface 43 and 47 is a function of the diameter of the wall section 42. The size of the wall section 42, in turn, is typically a function of the diameter of the pipe 12. As the included angle between the surface 43 and 47 decreases, the flow streamlining effect increases and at the same time the wall thickness between the edge 46 and the bore 37 increases. This increases the life of the tip member which is subject to constant erosion.

By way of example, for a 2" I.D. pipe, the base diameter for the annular wall section 42 is 1⅛"; the overall length of the tip member 33 is 1½"; the diameter of the bore 37 is 0.386"; the offset of the axis 50, 52 is ⅛"; the radius of the surface is 7/16"; the lead edge 46 has a radius of ⅛" from the axis 50; and the included angle between the surfaces 43 and 47 is about 55°.

Figure 11:
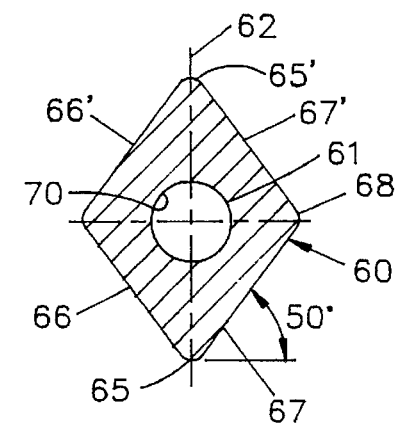
FIG. 11 is a view taken along line 11—11 of FIG. 10.

Another form of the invention is shown in FIGS. 8–11. As shown in FIG. 11, a tip member 60 can be formed in a symmetrical tear shaped configuration with respect to a lengthwise plane 62 which intersects a central axis 61. As illustrated, in one 180° quadrant, a lead edge 65 (see FIG. 11) is preferably rounded and extends by tapered surfaces 66, 67 to a central mid section 68. In the opposite 180° quadrant, a lead edge 65' extends by tapered surfaces 66', 67' to the central mid section 68. A transverse blind bore 70 for the thermocouple is located along the central axis 61 of the tip member 60.

In use, the tear shaped configuration of the tip member is aligned relative to the direction of fluid flow in a pipe and provides an aero-dynamic deflection surface for the fluid. After a period of use, the leading edge 65 of the tip member 60 facing the fluids will wear due to impingement with the fluids and particles in the fluids. It is however, a relatively simple and inexpensive operation to reverse the tip member 60 by rotating it 180° about the central axis 61 to place the other leading edge 65' into facing confrontation with the fluids. Thus, shut down time is minimized and the life of a tip member is doubled.

Figure 8:
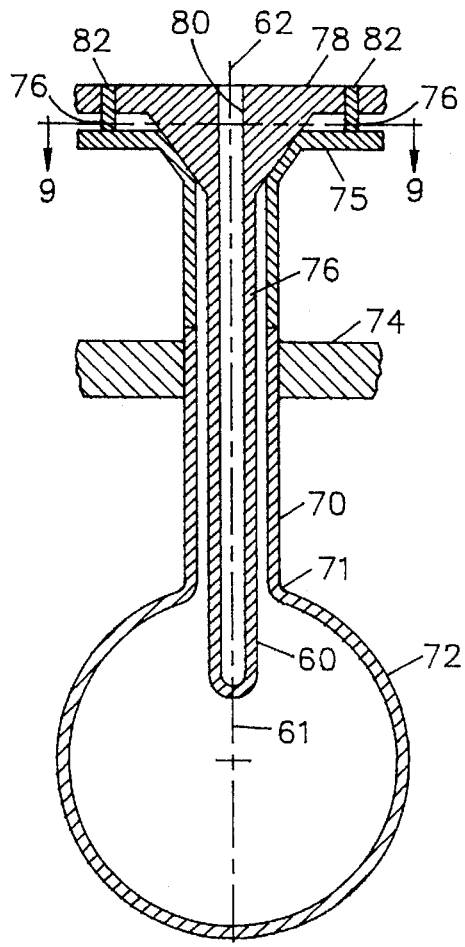
FIG. 8 is a view in cross-section of a modified form of the invention.
Figure 9:
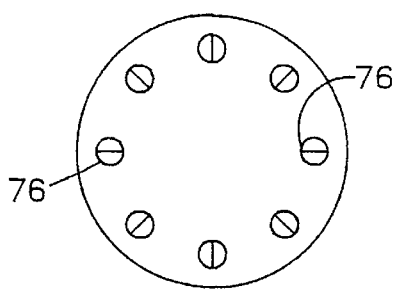
FIG. 9 is a view taken along line 9—9 of FIG. 8.

As shown in FIGS. 8 and 9, the tip member 60 is utilized in a bayonet type thermowell. In a bayonet type thermowell, a tubular extension 70 is connected by a T coupling 71 to a furnace pipe 72. The extension 70 is made from heat resistant materials and is sealed with respect to an opening through a furnace wall 74. On the exterior of the furnace wall 74 is a transverse arranged flange 75 which has diametrically portioned locator pins 76. A tubular bayonet member 76 is attached by welding to the tip member 60 and need not have the high temperature resistance as the tip member. The bayonet member 76 has a transversely arranged flange 78 and seats in the flange 75 to provide a pressure tight seal. The bayonet member 76 is wrapped in a refractory cloth to inhibit coking up the annulus between the bayonet member and the extension 70 and to permit removal of the bayonet. An exterior located bore 80 permits access of a thermowell unit. The flange 78 on the bayonet has alignment openings 82 for registry with the pins 76 on the lower flange. Attaching bolts (not shown) are utilized to attach the flanges to one another when the pins 76 are aligned with the openings 82.

The portion of the tip member 60 facing into the fluid flow has an increased thickness and shape to enhance its life span. By empirical methods or otherwise, when it is determined that the useful life of the tip member 60 has been reached, the furnace is shut down and the flange is released and rotated 180° to place the unused portion of the tip member in the fluid flow. Thus, the useful life is doubled.

By way of example, the tip member can be made of cast stellite #6 material which is suitable for high temperature operation in ethylene furnaces which operate at 1580° F. Particles of coke during a steam air cleaning can have an abrasion velocity of 700 fps. The bore diameter can be 0.400 inches and the overall length and width of the cross-section can be 1.375×0.875 inches which provides an included angle of about 80°.

While only selected embodiments of the present invention are illustrated and described herein, other embodiments of the invention are contemplated and many changes and modifications of the invention may be made within the scope of the appended claims without departing from the spirit of the invention.

I claim:

1. A thermowell apparatus for use in sensing temperature in piping in a cracker furnace including:

a one piece integral unit having a tubular body portion with a portion thereof arranged for use in the cracker furnace and having high temperature erosion resistant characteristics and being compatible for attachment by welding to a pipe in the cracker furnace where said pipe has high temperature resistance characteristics;

said integral unit having a lower tip member where said tip member has a cylindrically shaped section for positioning and welding to a cylindrically shaped opening in the pipe;

said tip member having a depending section from the cylindrically shaped section where said depending section is disposed within the bore of the pipe and is arranged transverse to the flow of fluids in the pipe;

said depending section having a forward, leading edge surface disposed transverse to the central axis of the pipe into the direction of fluid flow in the pipe and having angularly arranged side surfaces connecting to a rearward wall surface;

said body portion having a central bore disposed along a first transverse axis to said central axis, said central bore being sized for receiving a cylindrically shaped thermocouple member;

said depending section having a blind bore disposed along a second transverse axis to said central axis, said blind bore being smaller in diameter than said central bore and said second transverse axis offset longitudinally from said first transverse axis along said central axis, said blind bore being sized to receive said thermocouple and said blind bore being disposed closer to the rearward wall surface than to the leading edge surface.

2. The apparatus as set forth in claim 1 wherein there is a connecting surface between the central bore and the blind bore which is inclined for guiding a thermocouple into the blind bore.

3. The apparatus as set forth in claim 1 wherein the tip member is constructed from stellite #6 steel material.

4. The apparatus as set forth in claim 1 wherein said side surfaces have an included angle of approximately 55°.

* * * * *